United States Patent [19]

Suzuki et al.

[11] Patent Number: 4,847,790
[45] Date of Patent: Jul. 11, 1989

[54] PRESSURE-CONTROLLING APPARATUS EMPLOYED IN PRE-CHAMBER OF ENVIRONMENTAL TESTING CHAMBER FOR SELF-PROPELLED VEHICLE

[75] Inventors: Nobuo Suzuki; Ikuhide Ota, both of Tokyo; Masanobu Ishii, Yokohama, all of Japan

[73] Assignee: Kabushiki Kaisha Toyo Seisakusho, Tokyo, Japan

[21] Appl. No.: 23,482

[22] Filed: Mar. 9, 1987

[30] Foreign Application Priority Data

Jul. 3, 1986 [JP] Japan .................. 61-102915[U]

[51] Int. Cl.⁴ .................. G01M 17/00; G06F 15/20
[52] U.S. Cl. .................. 364/551.01; 364/550; 364/558; 364/424.03; 73/865.6
[58] Field of Search .................. 364/550, 551, 558, 424, 364/805, 806; 73/117.1, 117.2, 865.6, 147; 434/42, 43

[56] References Cited

U.S. PATENT DOCUMENTS 3,878,376  4/1975  Sholes, Jr. et al. .................. 364/558
4,313,726  2/1982  Chase .................. 434/43

FOREIGN PATENT DOCUMENTS 0184943  11/1982  Japan .................. 73/865.6
0183222  6/1968  U.S.S.R. .................. 73/865.6

Primary Examiner—Parshotam S. Lall
Assistant Examiner—Ellis B. Ramirez
Attorney, Agent, or Firm—Frishauf, Holtz, Goodman & Woodward

[57] ABSTRACT

In a pressure-controlling apparatus employed in a pre-chamber of an environmental testing chamber for a self-propelled vehicle, in which testing chamber various tests are conducted under a subatmospheric pressure, which testing chamber is provided with the pre-chamber for permitting an opertor's getting in/out of the testing chamber, the improvement resides in that: operational switch means provided in the pre-chamber permit the operator to open/close a first and a second opening/closing valves, which first opening/closing valve is provided in a first air-duct which opens into open air at one end and into said pre-chamber at the other end for recovering an air-pressure of the pre-chamber, which second opening/closing valve is provided in a second air-duct which opens into the testing chamber at one end and into the pre-chamber at the other end for reducing the air-pressure of the pre-chamber.

11 Claims, 2 Drawing Sheets

PRESSURE-CONTROLLING APPARATUS EMPLOYED IN PRE-CHAMBER OF ENVIRONMENTAL TESTING CHAMBER FOR SELF-PROPELLED VEHICLE

BACKGROUND OF THE INVENTION

1. Field of the Invention

The present invention relates to a pressure-controlling apparatus employed in a pre-chamber of a low-atmospheric pressure environmental testing chamber for conducting various durability tests of a self-propelled vehicle such as an automobile and like vehicles housed in the testing chamber an atmospheric pressure of which is kept low.

2. Description of the Prior Art

A performance and durability test of the automobile, in which test an automobile's drive in mountainous districts is simulated, is conducted in an environmental testing chamber an indoor-pressure of which is lower than the pressure of open air. In such a conventional low-atmospheric pressure environmental testing chamber is provided a pre-chamber which is a preliminary chamber for allowing an operator to get in/out of the testing chamber without being subjected to a drastic change of the atmospheric pressure.

However, in the conventional pre-chamber, a control of the air-pressure therein is difficult in operation. In other words, in the operation, a considerably high technique and a skill are required to make it impossible for an average operator to conduct such control of the air-pressure in the pre-chamber.

SUMMARY OF THE INVENTION

It is an object of the present invention to enable even an average operator, who receives no training as to a special technique for controlling the air-pressure of the pre-chamber, to easily control the air-pressure of the pre-chamber by operating a switch means, so as to ensure the operator's safe getting in/out of the low atmospheric pressure testing chamber.

It is another object of the present invention to permit the control of the air-pressure of the pre-chamber to be gradually conducted upon operation of the switch means, so that the operator is subjected to a physiologically adverse affection at the least possible degree.

The above objects of the present invention is accomplished by the following apparatus:

In a pressure-controlling apparatus employed in a pre-chamber of an environmental testing chamber for a self-propelled vehicle, in which testing chamber various tests are conducted under a subatmospheric pressure, said testing chamber being provided with said pre-chamber for permitting an operator's getting in/out of said testing chamber, the improvement wherein: operational switching means provided in said pre-chamber permit the operator to open/close a first and a second opening/closing valves, said first opening/closing valve being provided in a first air-duct which opens into open air at one end and opens into said pre-chamber at the other end for recovering an air-pressure of said pre-chamber, said second opening/closing valve being provided in a second air-duct which opens into said testing chamber at one end and into said pre-chamber at the other end for reducing the air-pressure of said pre-chamber.

DESCRIPTION OF THE PREFERRED EMBODIMENTS

Figure 1:
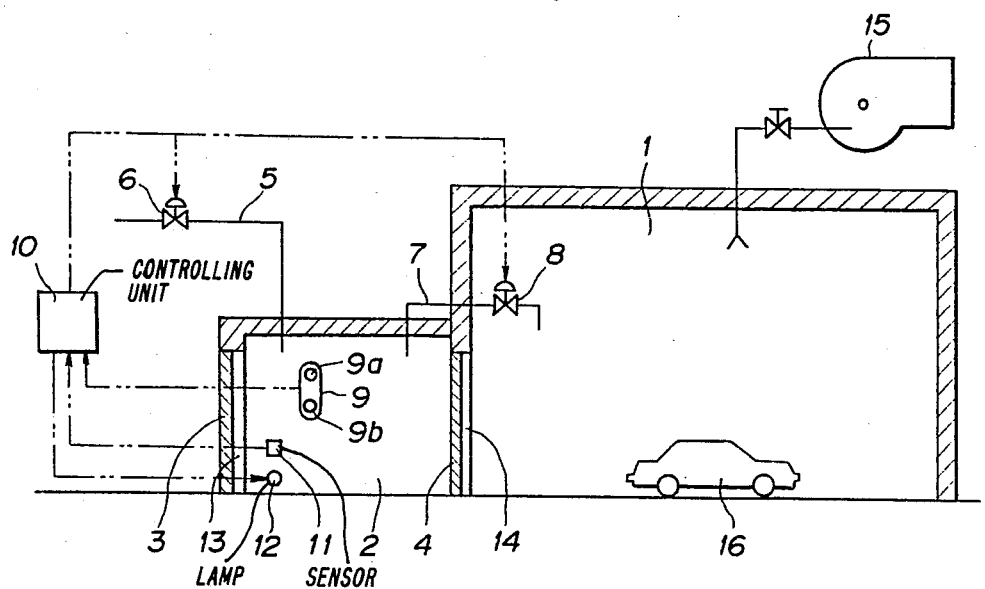
FIG. 1 is a schematic view of an embodiment of a low-atmospheric pressure environmental testing chamber provided with a pressure-controlling apparatus of the present invention.

Hereinbelow, the present invention will be described in detail with reference to the embodiments thereof shown in the drawings.

In FIG. 1, the reference numeral 1 denotes a low-atmospheric pressure environmental testing chamber in which a self-propelled vehicle such as an automobile 16 and the like is tested in its performance under various weather-condition. An air-pressure inside the testing chamber 1 is kept in a low-atmospheric pressure, i.e., subatmospheric pressure by means of a blower 15 which appropriately discharges an air confined in the testing chamber 1.

The testing chamber 1 is provided with a pre-chamber 2 which is a small chamber for permitting an operator to get in/out of the testing chamber 1. In a doorway 13 of the pre-chamber 2 is provided a door 3, while another door 4 is provided in a doorway 14 of the testing chamber 1.

As shown in FIG. 1, the pre-chamber 2 is provided with a first air-duct 5 which opens into open air at one end and into the pre-chamber 2 at the other end. In the first air-duct 5 is provided a first solenoid valve 6 for permitting the pressure-recovering of the pre-chamber 2.

The pre-chamber 2 is also provided with a second air-duct 7 which opens into the testing chamber 1 at one end and into the pre-chamber 2 at the other end. In the second air-duct 7 is provided a second solenoid valve 8 for permitting the pressure-reduction of the pre-chamber 2.

In addition, the pre-chamber 2 is provided with operational switching means 9 for operating the first 6 and the second 8 solenoid valves, together with a sensor 11 for detecting the air-pressure of the pre-chamber 2, which sensor 11 issues a detection-signal to a controlling unit 10.

In the controlling unit 10, on the basis of an air-pressure detection signal issued from the sensor 11, a judgment is made as to whether the air-pressure of the pre-chamber 2 is reduced to a predetermined subatmospheric pressure or not, or as to whether the air-pressure of the pre-chamber 2 is returned to the normal atmospheric pressure or not, so that an indicator lamp 12 provided in the pre-chamber 2 is turned on at a time when the pressure-reduction or the pressure-recovering of the pre-chamber 2 is accomplished.

Figure 2:
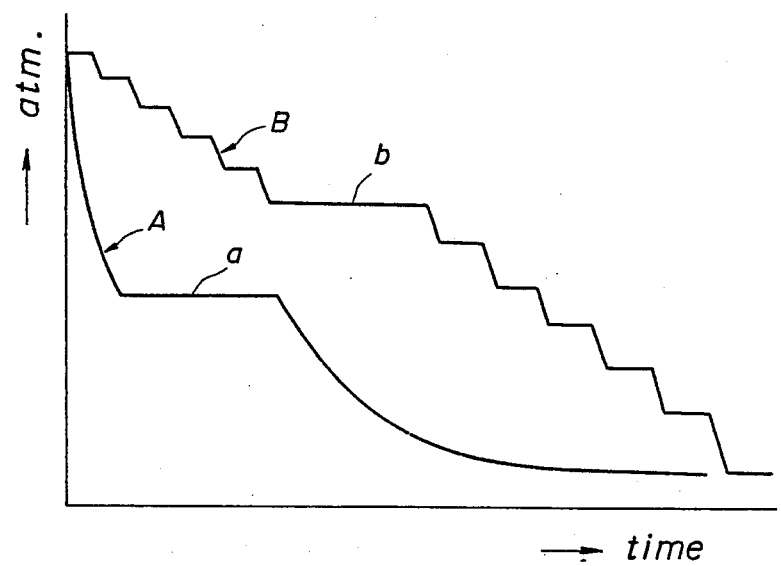
FIG. 2 is a graph illustrating characteristics of pressure-reduction conducted in a pre-chamber of the environmental testing chamber.

Further, the controlling unit 10 issues signals for opening/closing the first 6 and the second 8 solenoid valves. In the controlling unit 10 is incorporated a program for repeatedly opening/closing the solenoid valves 6, 8 to conduct stepwise the pressure-reduction and the pressure-recovering of the pre-chamber 2 as shown in a graph "B" of FIG. 2.

Incidentally, another graph "A" illustrates a pressure-variation produced in the pre-chamber 2 in its pressure-reduction and pressure-recovering processes in case that the solenoid valves 6, 8 are opened/closed in a simple manner, "a" part of which graph "A" illustrates an air-pressure of the pre-chamber 2 in case that the solenoid valves 6, 8 are closed.

In case that the operator enters the low-atmospheric pressure environmental testing chamber 1, the operator firstly enters the pre-chamber 2 in which he turns off a pressure-recovering switch 9a of the operational switching means 9 to close the first valve 6 which is used in the pressure-recovering process of the pre-chamber 2, and then turns on a pressure-reducing switch 9b of the operational switching means 9, so that the controlling unit 10 issues a signal to the second solenoid valve 8 to open the same 8. As a result, an air confined in the pre-chamber 2 is sucked into the testing chamber 1 so that the air-pressure of the pre-chamber 2 is reduced. At this time, according to the signal issued from the controlling unit 10, the second solenoid valve 8 is repeatedly opened/closed to make the pressure-reduction of the pre-chamber 2 be gradually conducted. When the air-pressure of the pre-chamber 2 reaches the sub-atmospheric pressure of the testing chamber 1, the indicator lamp 12 is turned on the lighting of which is confirmed by the operator. After confirming such lighting, the operator opens the door 14 of the testing chamber 1 to enter the same 1.

In case that the operator gets out of the testing chamber 1, he firstly turns off the pressure-reducing switch 9b to close the second solenoid valve 8, and then turns on the pressure-recovering switch 9a to open the first solenoid valve 6 to make the open air enter the pre-chamber 2 in order to conduct the pressure-recovering of the pre-chamber 2, which pressure-recovering is gradually conducted according to the signal issued from the controlling unit 10. When the air-pressure of the pre-chamber 2 reaches the atmospheric pressure, the indicator lamp 12 is turned on, so that the operator, after confirming the lighting of the indicator lamp 12, opens the door 13 of the pre-chamber 2 to get out of the same 2.

Incidentally, in case that the operator feels ill on the midway of the pressure-reducing operation or the pressure-recovering operation of the pre-chamber 2, it is possible for the operator to temporarily stop such operation by turning off the pressure-reducing switch 9b or the pressure-recovering switch 9a until he recovers. After his recovering, the pressure-reducing switch 9b or the pressure-recovering switch 9b is again turned on to conduct the pressure-control of the pre-chamber 2.

As described above, in the apparatus of the above embodiment of the present invention, even an average operator having received no training as to a special technique for conducting the pressure-control of the pre-chamber 2, he can conduct such pressure-control of the pre-chamber 2 by simply operating these pressure-reducing 9b and the pressure-recovering 9a switches provide in the pre-chamber 2, so as to get in/out of the testing chamber 1 in a safe manner.

Further, the pressure-controlling apparatus of the present invention enables the operator to gradually conduct the pressure-control of the pre-chamber 2 so that the operator is subjected to a physiologically adverse effect at the least possible degree.

Incidentally, in the above embodiment of the present invention, the first 6 and the second 8 solenoid valves are employed as the first and the second opening/closing valves, respectively. However, it is also possible to employ motor-valves as such opening/closing valves.

In case that the motor-valves are employed in place of the solenoid valves 6 and 8, the program incorporated in the controlling unit 10 is so prepared that both of the pressure-reducing and the pressure-recovering operations are gradually conducted to assume a smooth graph similar to the graph "B".

Figure 3:
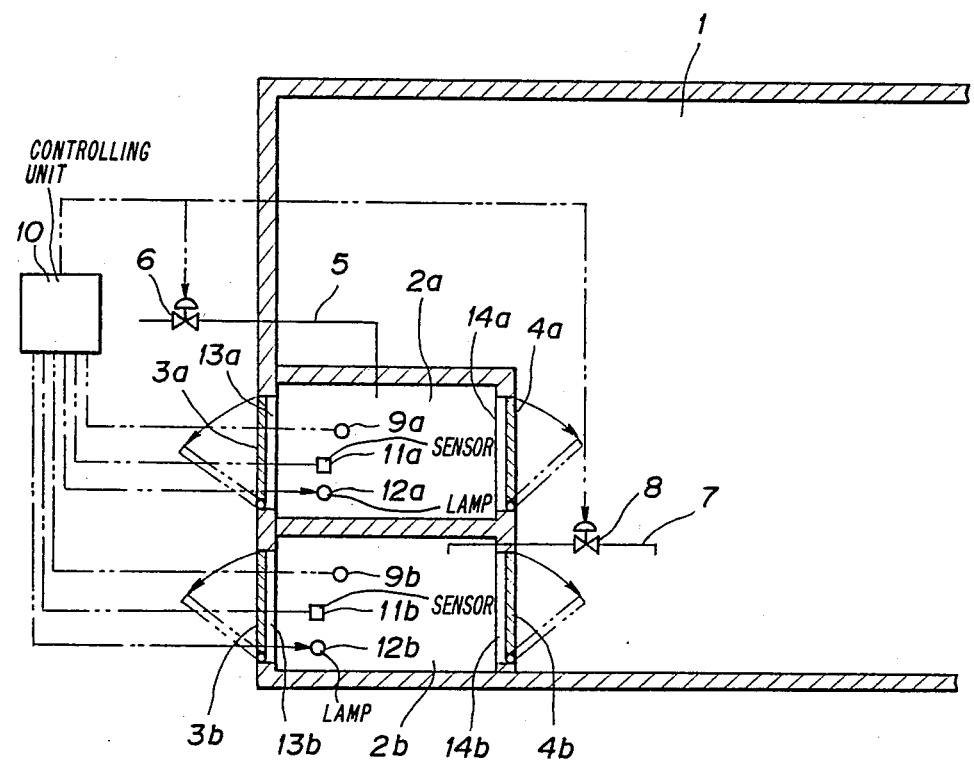
FIG. 3 is a plan view of another embodiment of the low-atmospheric pressure environmental testing chamber provided with the pre-chamber which is partitioned into an entrance-purpose section and an exit-purpose section of the testing chamber.

FIG. 3 shows another embodiment of the testing chamber 1 in which the pre-chamber is partitioned into an entrance-purpose pre-chamber 2b and an exit-purpose pre-chamber 2a to ensure the operator's safer getting in/out of the testing chamber 1.

In this another embodiment of the testing chamber 1, in case that the operator enters the testing chamber 1, he firstly opens a door 3b fitted to an entrance portion of the entrance-purpose pre-chamber 2b to enter the same 2b, and then operates the pressure-reducing switch 9b to open the second solenoid valve 8 so that the air-pressure of the entrance-purpose pre-chamber 2b reaches to the subatmospheric pressure of the testing chamber 1 to allow the operator to open a door 4b fitted to an entrance portion 14b of the testing chamber 1. After opening the door 4b, the operator enters the testing chamber 1.

In case that the operator gets out of the testing chamber 1, he firstly opens a door 4a fitted to an exit portion 14a of the testing chamber 1 to enter the exit-purpose pre-chamber 2a in which he operates the pressure-recovering switch 9a to open the first solenoid valve 6, so that the air-pressure of the exit-purpose pre-chamber 2a reaches the atmospheric pressure. After reaching the atmospheric pressure, the operator opens a door 3a fitted to an exit-portion of the exit-purpose pre-chamber 2a to get out of the same 2a.

Incidentally, in this another embodiment of the testing chamber 1, the reference numerals 11a and 11b denote air-pressure detecting sensors provided in the exit-purpose 2a and the entrance-purpose 2b pre-chambers, respectively; and the reference numerals 12a and 12b denotes alarm-indicating lamps provided in the exit-purpose 2a and the entrance-purpose 2 pre-chambers respectively, which lamps 12a and 12b act in the same manner as that 12 of the embodiment shown in FIG. 1.

What is claimed is:

1. A pressure-control apparatus for environmental testing of a vehicle within a testing chamber, said testing chamber having its interior maintained at a predetermined sub-atmospheric pressure, and having at its entrance a pre-chamber through which an operator enters and leaves said testing chamber, said apparatus comprising:

first means for selectively communicating said pre-chamber with a source of sub-atmospheric pressure;

second means for selectively communicating said chamber with a source of atmospheric pressure;

control means coupled to the first and second means for selectively opening and closing communication through said first and second means, and including pressure-changing means for gradually and controllably varying the pressure in the chamber by repeatedly cycling one of the first and second means in a plurality of open-and-closed cycles, with each such cycle generating a pressure change substantially less than a pressure differential between atmospheric pressure and the predetermined sub-atmospheric pressure in the testing chamber.

2. The pressure-control apparatus of claim 1, wherein said source of atmospheric pressure is the open exterior of said pre-chamber.

3. The pressure-control apparatus of claim 1, wherein said source of sub-atmospheric pressure is the interior of the testing chamber.

4. The pressure-control apparatus of claim 1, further comprising an indicator means coupled to the control means for providing a signal when pressure in the pre-chamber reaches a desired level.

5. The pressure control apparatus of claim 1, wherein said first means is a valve.

6. The pressure control apparatus of claim 1, wherein said second means is a valve.

7. The pressure-control apparatus of claim 1, wherein the pressure-changing means comprises a pressure-reducing means for controlling operation of the first means.

8. The pressure-control apparatus of claim 7, wherein the pressure changing means further comprises a pressure-raising means for controlling operation of the second means.

9. The pressure-control apparatus of claim 8, wherein the pressure-reducing means comprises one pre-chamber and the pressure-raising means comprises another pre-chamber.

10. The pressure-control apparatus of claim 1, wherein said pressure changing means includes a switch means for initiating said repeated cycling when manually actuated by the operator.

11. The pressure-control apparatus of claim 10, wherein said switch means is inside said pre-chamber.

* * * * *